United States Patent Office 2,872,431
Patented Feb. 3, 1959

2,872,431

COMPOSITIONS COMPRISING A RUBBER AND A HALOGENATED REACTION PRODUCT OF FURFURAL AND BUTADIENE

Mortimer T. Harvey, South Orange, and Edward Breznak, Garfield, N. J., assignors to Harvel Research Corporation, a corporation of New Jersey No Drawing. Application October 4, 1954
Serial No. 460,245

4 Claims. (Cl. 260—45.5)

This invention relates to novel compositions of matter and to methods for preparing them. In one of its more specific aspects the invention is directed to halogenated derivatives of reaction products produced by reacting furfural and butadiene 1,3. In one of its other aspects this invention is directed to novel products produced by combining one or more of said halogenated derivatives with certain other components.

It has been well known in the art that in the extractive distillation of $C_4$ hydrocarbon materials containing butadiene 1,3 in which furfural is employed as the selective solvent, there are formed certain by-products generally known in the art as residues formed in the furfural extractive distillation method for the purification of butadiene 1,3. Said residues are in the nature of tarry masses and vary in consistency from dark practically solid, semi-solid to fairly fluid light colored liquid masses. Said residues have a softening point (ball and ring) no greater than 80° F. and for a long time were not found useful commercially and were regarded and treated as useless waste products presenting a disposal problem. In commercial practice, as known to us, such residues or by-products were disposed of by burning, in some instances. We have discovered that said residues as well as fractions thereof may be halogenated to provide novel and highly useful products finding use in a number of different arts.

Said residues as well as fractions thereof are the starting materials of this invention. By fractions we mean the distillates of said residues produced by the heat distillation of said residues produced by the heat distillation of said residues generally under atmospheric or subatmospheric pressures as well as the residual fractions so produced which residual fractions measure at least 60% by weight of said residues on a dry basis. Said residual fractions may be either liquid or solid and are in all cases liquid at a temperature of 230° F. Also, if desired, the starting material may be any of said distillates or residual fractions as well as combinations of one or more of them which may or may not have been polymerized or thickened with or without the addition of an alkaline or acidic catalyst and by the use of heat to provide temperatures of 250–400° F. In general the thickening may be accomplished in factory practice by the use of an alkaline catalyst such as sodium hydroxide, potassium hydroxide, calcium hydroxide, etc. In order to raise the pH thereof to a value of at least 8 and generally in the range of 8–12 or by the use of an acidic catalyst such as sulfuric acid, hydrochloric acid, boron trifluoride, para-toluene sulfonic acid, etc. in order to reduce the pH thereof to a value no greater than 4 and generally in the range of 1.5–4. While under said pH conditions the mass may be maintained at a temperature between 250–400° F. in order to increase the viscosity thereof to the desired value to provide products of the desired thickness or polymerization. However, it is to be understood that these thickened products that are to be employed herein as starting materials should be liquid or capable of flowing at a temperature of 230° F. although some of them may be solids at room temperature (25° C.).

When the distillation of said residues is carried out at subatmospheric pressure, the temperatures employed may vary depending upon the degree of vacuum and also upon the proportion of distillate desired as well as the softening point of the residual fraction, if any, which may be required. For such purposes the pressure may be 0.5 to 200 mm. of mercury but in factory practice we prefer that it be 5–125 mm. of mercury pressure and the temperature employed may be between about 210° F.–400° F. It is to be understood that the sub-atmospheric pressure and temperatures as well as the time of distillation are all controlled depending upon the proportion of distillate fraction required as well as the softening point characteristic desired, if any, in the residual fraction of the residue. In most cases it is preferable that the distillation be carried out in the subatmospheric pressure range of 5–125 mm. of mercury pressure, the temperature employed by 225° F.–400° F. for sufficient time to obtain the desired quantity of furfural-butadiene 1,3 reaction product distillate and leaving behind a residual fraction which may be either liquid or solid at 25° C. and if solid, has a softening point (ball and ring) no greater than 230° F. When the distillation is accomplished at atmospheric pressure, temperatures in the range of 400–600° F. may be employed.

According to this invention said residues, distillate fractions and residual fractions, liquid at a temperature of 230° F. as well as thickened products or polymers thereof all liquid at 230° F. may be, individually or in combination, halogenated by contacting them with free chlorine and/or free fluorine until the amount of free halogen combined therewith measures at least 1% and generally 1–20% of the weight of the material to be halogenated. The combining of the free halogen with the starting material occurs as direct addition and/or hydrogen replacement because some hydrohalogen comes off during halogenation. The halogenation may be accomplished in a number of different ways depending upon whether or not the starting material is liquid or solid at room temperature. When the starting material is liquid at room temperature and has a viscosity no greater than approximately 20,000 cp. at 25° C., halogenation may be accomplished by merely bubbling the free halogen therein under constant stirring until the desired amount of halogen has been combined therewith. The addition of the free halogen thereto is accompanied by an exothermic reaction as evidenced by the temperature of the mass rising. We have found that besides an increase in temperature during the absorption of the halogen by said starting material, there is a visible thickening. When the halogenated product becomes so thick as not to permit ready bubbling of additional halogen therein, the halogenation may be terminated. Said halogenated material may be heated to maintain it fluid and while in said condition additional halogen is added until the desired amount of halogen has been combined therewith.

When the starting materials and especially those starting materials which may be either the residues or the residual fractions as well as the polymerized residues, distillates or residual fractions which may be either thermoplastic solids or liquids, having a viscosity above 20,000 cp. at 25° C. are employed, it is recommended that halogenation be carried out by bubbling the halogen into a solution of either one of them or a combination of two or more of them. For this purpose said starting materials are first dissolved in an inert organic solvent such as xylol or ketone, such as acetone, etc. chlorinated solvents, etc. and while being constantly stirred, the halogen is bubbled therein until the desired amount of halogen has been combined with said starting material in solution, Instead of employing a solvent with said starting materials of higher viscosity, they may be heated to the desired fluidity and the halogen added thereto.

The following examples are given merely by way of illustrating some of the starting materials which may be employed in the practice of this invention.

*Example A*

Into a tank was placed about 500 lb. of a water-laden raw residue obtained as a by-product in the purification of butadiene 1,3 in which the furfural extractive method was employed. The mass was maintained at about 260–280° F. until it had become substantially completely dehydrated and in this condition was found to have a viscosity of approximately 7,000 cp. at 25° C. and is hereinafter known as product A.

*Example B*

About 100 lb. of product A was transferred into a vessel having a stirrer. While being constantly stirred, vacuum was applied to the vessel. The mass of product A in said vessel was maintained under a 25″–30″ vacuum while being constantly stirred and maintained at a temperature of approximately 325° F. for about 10 hours. Some distillate came off and was collected and is hereinafter known as product B, leaving behind a residual fraction.

*Example C*

The residual fraction of Example B was poured into pans and allowed to cool to room temperature whereupon it was converted to a thermoplastic solid having a softening point (ball and ring) of 165° F. and is hereinafter known as product C.

*Example D*

About 50 lb. of product A was transferred into a vessel and the temperature thereof was raised slowly to 600° F. while under atmospheric pressure and the distillate was collected and is hereinafter known as product D.

*Example E*

About 50 lb. of product A was transferred into a vessel and the temperature thereof was raised to and maintained for a short period of time at about 430° F. The distillate was collected and is hereinafter known as product E, leaving behind a residual fraction.

*Example F*

The residual fraction of Example E was poured into shallow pans and allowed to cool to room temperature at which temperature it was a thermoplastic solid having a softening point (ball and ring) of approximately 150° F. and is hereinafter known as product F.

All of said products A–F may be polymerized by the use of heat with or without acid conditions or alkaline conditions as hereinbefore set forth. In all cases the extent of polymerization is terminated so that all of the polymers, hereinafter known as products AP, BP, CP, DP, EP and FP respectively, are liquid or will flow at a temperature no greater than 230° F.

The following examples illustrate the manner of making some of the halogenated products of this invention, all parts being given by weight unless otherwise specified.

*Example 1*

100 parts of product A were placed in a glass vessel into which was bubbled free chlorine. As the chlorine was added, the temperature of the mass increased and upon reaching approximately 110° C. visible thickening occurred. Throughout this addition the mass was constantly stirred. While being agitated, the chlorine addition was continued, the temperature of the mass continued to rise and when it reached 130° C. it was too thick for stirring and the chlorine addition was terminated. A sample of the mass was removed and the chlorine content was determined and was found to be approximately 10–12%. The softening point (ball and ring) of that sample was measured and found to be between 170°–200° F. In order to increase the chlorine content, the mass was heated to 140° C. whereby the mass became sufficiently fluid for stirring. Stirring was again started and the source of external heat was removed and free chlorine again bubbled in. The temperature of the mass was increased as the chlorine was added. When the mass reached a temperature of approximately 150° C. it was again too thick for stirring and the chlorine addition was terminated. This halogenated product is known hereinafter as product AC.

*Example 2*

About 100 parts by weight of product B was charged into a glass vessel having a stirrer. While being constantly stirred, chlorine was added thereto and the temperature of the mass rose. Upon continued chlorine addition the mass was too thick for stirring and the chlorine addition was terminated. The chlorinated mass was cooled to room temperature and was found to be a fairly brittle thermoplastic solid hereinafter known as product BC having a chlorine content of approximately 15%.

*Example 3*

About 100 parts of residual fraction, products C and F, were individually heated to approximately 250° F. while being constantly stirred and chlorine was added thereto. The temperature rose and the external source of heat was removed and the mass thickened. When it became too thick for stirring the chlorine addition was terminated and the mass was allowed to cool. It was found to have a chlorine content of more than 1% and was a thermoplastic solid known hereinafter as products CC and FC respectively.

*Example 4*

Using the same procedure as that set forth in Example 2 but employing 100 parts of product D or product E in place of product B, there was obtained a thermoplastic solid having a chlorine content greater than 5% and hereinafter known as products DC and EC.

*Example 5*

Employing the same procedure as that set forth in Example 1, but in place of product A there is used product AP which is product A which has been polymerized either under alkaline or acidic conditions and having a softening point (ball and ring) of approximately 120° F., there was produced chlorinated product AP having a chlorine content greater than 1% and is hereinafter known as product APC.

The same procedure was followed with products CP and FP respectively which are polymerized residual fractions C and F which have been polymerized either under acidic or alkaline conditions to have raised their softening points (ball and ring) approximately 30° F. The resultant chlorinated products were thermoplastic solids having a chlorine content greater than 1% and being hereinafter known as products CPC and FPC respectively.

*Example 6*

The same procedure as that set forth in Example 2 was employed except that for product B there was employed products BP, DP or EP which are the distillates B, D and E respectively polymerized under acidic or alkaline conditions to such a degree that their viscosity at 25° C. measured approximately 10 times that of the original material. The resultant chlorinated products were all thermoplastic solids having a chlorine content of at least 5% and are hereinafter known as products BPC, DPC and EPC respectively.

Example 7

The same procedure as that set forth in Examples 1-6 may be used and fluorine is used in place of chlorine to provide another class of halogenated products.

All of said halogenated products, examples of which have hereinbefore been set forth for the purposes of illustration, find application in combination with products R which are a class of materials consisting of one or a combination of two or more of the following: natural rubber, reclaimed rubber, normally solid polymers of chloroprene, normally solid homopolymers of butadiene 1,3, normally solid copolymers of butadiene 1,3 and styrene and normally solid copolymers of butadiene 1,3 and acrylonitrile. In general the ratio by weight of the halogenated product or products to said products R is in the range of 2-200 parts of the former to 100 parts of the latter.

In is also within the purview of this invention to provide novel compositions by combining one or a combination of two or more of said novel halogenated products with one or a combination of two or more of normally solid vinyl esters and/or acetals examples of which are polyvinyl chloride, polyvinyl acetate, copolymers of vinyl chloride and vinyl acetate, etc., polyvinyl formal, polyvinyl butyral and polyvinyl acetal, the ratio by weight of the halogenated product to the vinyl compound is 100 of the former to 2-200 parts of the latter depending upon the physical characteristics desired in the end product, and the use to which it is to be put. They may be combined with each other by means of heat and may be cast or extruded to serve as flame retardant electric insulating materials.

In addition, this invention also contemplates the production of three-component systems with one or a combination of two or more of said halogenated products together with one or a combination of two or more of said products R and one or a combination of two or more of said vinyl compounds with the ratio of the first to the second being as before set forth and the ratio of the third to the second being as before set forth.

By combining one or more of said novel halogenated products together with one or a combination of two or more of said products R and especially when combined with the normally solid copolymers of butadiene 1,3 and acrylonitrile, said novel halogenated products impart high tensile strength, high durometer and high ozone resistance characteristics thereto and at the same time impart great ease of milling and eliminate for all practical purposes any scorching during milling. They may be substituted advantageously wholly or in part for the phenolic resins heretofore generally employed for making hard rubber stocks. The phenolic resins, as is well known, are extremely difficult to mill and have a pronounced tendency to cause scorching during milling. Said products R when combined with the novel halogenated products may be cured to a hard, tough stock with high tensile strength. The following is an example of a stock produced employing one of the halogenated products of this invention.

Example 1

100 parts of "Hycar 1002" (solid polymer of butadiene 1,3 and acrylonitrile)
1 part of stearic acid
5 parts of zinc oxide
100 parts of product AC
8 parts of sulfur
1.5 parts benzothiazyl disulfide were milled together on a cold mill according to general milling procedure and then cured under pressure for 30 minutes at 325° F. The resultant rubber stock had the following characteristics:

Hardness _____ 99-100 (Shore A).
Tensile strength _____ 3800-4000 p. s. i.
Elongation _____ 250%.

Any of the other halogenated materials or combinations of two or more of them may be substituted for product AC in the aforesaid example, however, the resultant characteristics of the stock of course will vary depending upon the halogen content of the halogenated material employed.

Said novel halogenated products, either alone or in combination, may be compounded with the other products R herein set forth to provide rubber stocks of higher durometer and greater ozone resistance.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

Having thus described our invention, what we claim is:

1. A novel composition of matter comprising an intimate combination of (A) a material selected from the group consisting of natural rubber, reclaimed rubber, normally solid polymers of chloroprene, normally solid homopolymers of butadiene 1,3, normally solid copolymers of styrene and butadiene 1,3 and normally solid copolymers of acrylonitrile and butadiene 1,3 and (B) halogenated organic reaction product of furfural and butadiene 1,3 said halogen selected from the group consisting of chlorine and fluorine and measuring at least 1% by weight of said product.

2. A composition of matter defined in claim 1, with said halogen being chlorine.

3. A novel composition of matter comprising an intimate combination of a normally solid copolymer of acrylonitrile and butadiene 1,3 and halogenated organic reaction product of furfural and butadiene 1,3 said halogen selected from the group consisting of chlorine and fluorine and measuring at least 1% by weight of said product.

4. A composition of matter defined in claim 3, with said halogen being chlorine.

References Cited in the file of this patent

UNITED STATES PATENTS

| | | |
|---|---|---|
| 2,490,462 | Novotny et al. | Dec. 6, 1949 |
| 2,572,577 | Tissol et al. | Oct. 23, 1951 |
| 2,610,116 | Goodhue et al. | Sept. 9, 1952 |
| 2,683,151 | Hillyer et al. | July 6, 1954 |